United States Patent [19]

Hahn

[11] Patent Number: 4,574,512
[45] Date of Patent: Mar. 11, 1986

[54] GAFF

[76] Inventor: Paul L. Hahn, 150 Iris St., Broomfield, Colo. 80020

[21] Appl. No.: 495,048

[22] Filed: May 16, 1983

[51] Int. Cl.⁴ .................. A01K 97/14; A01K 97/01
[52] U.S. Cl. .......................... 43/5; 294/26; 294/19.3
[58] Field of Search .............. 43/5, 6; 119/151, 152, 119/153, 154; 294/17, 110 A, 61, 26, 55.5, 19 R

[56] References Cited

U.S. PATENT DOCUMENTS

| | | | |
|---|---|---|---|
| 2,184,216 | 12/1939 | Gross | 294/61 |
| 2,196,117 | 4/1938 | Lange | 43/5 |
| 2,233,670 | 4/1941 | Lee | 43/5 |
| 3,883,252 | 9/1974 | Redding | 43/5 |
| 4,037,554 | 7/1977 | Foscolo | 43/5 |
| 4,169,330 | 10/1979 | Schnur | 43/5 |
| 4,351,126 | 9/1982 | Simonson | 43/5 |

FOREIGN PATENT DOCUMENTS

| | | | |
|---|---|---|---|
| 699302 | 12/1964 | Canada | 43/5 |
| 5347 | 12/1984 | United Kingdom | 43/5 |

Primary Examiner—Nicholas P. Godici
Assistant Examiner—C. McKee

[57] ABSTRACT

A fishing device, used by fishermen for gaffing a fish, which has two hooks at one end of a shaft at an angle to positively engage and retrieve fish; and a handle at the other end of the shaft with a strap to wrap around wrist to secure gaff to fisherman to avoid loss of gaff by pull of fish or slipping of gaff from hand.

1 Claim, 3 Drawing Figures

GAFF

BACKGROUND OF THE INVENTION

1. Field of the Invention

This invention relates to fishing tools and a new and useful improvement in fish retrievers and particularly to a fish retriever capable of landing a fish through an ice hole or after it has been brought in close by a hook and line.

2. History of the Prior Art

Gaff hooks have been historically used on fishing boats, at piers by surf fishermen for loading and handling fish that have been caught on a line or in a net.

Other various types of fish retrievers have heretofore been proposed for landing fish. One such fish retriever is a net by means of which the fish is scooped from the water. Nets have serious disadvantages however, one of which is that in order to be effective it must be brought up from underneath or moved frontwise into the fish.

A net cannot be used in ice fishing. Many gaff hooks exist but are difficult or complicated to manipulate, lessening their ability for quick use.

SUMMARY OF THE INVENTION

Prior art devices for gaffing fish are not easily used or efficient for ice fishing since they must be mechanically unfolded or manually opened for use thus losing valuable time.

It is the principal object of the present invention to provide an improved fishing device ideally arranged for ice fishing but adaptable for open water fishing.

It is a further object of the invention, due to design of and placement of hooks, to retrieve fish without excess force or danger of loss.

It is a further object of the invention to secure a gaff by strap on wrist of fisherman, leaving hand free for use of the gaff without concern for loss of the gaff through an ice hole or in open water while retrieving fish.

It is still another object of the invention to provide means wherein the hooks for gaffing the fish are mounted and secured substantially positively against any movement with relation to the pole until the operation of gaffing the fish has been completed.

BRIEF DESCRIPTION OF THE DRAWINGS

In order that the present invention may be more fully understood it will now be described, by way of example, with reference to the accompanying drawings in which.

DESCRIPTION OF THE PREFERRED EMBODIMENTS

Figure 1:
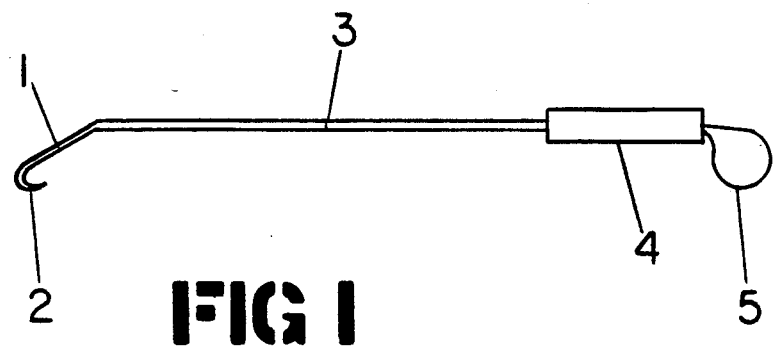
FIG. 1 is a side view of a fishing device constructed according to the invention.
Figure 2:
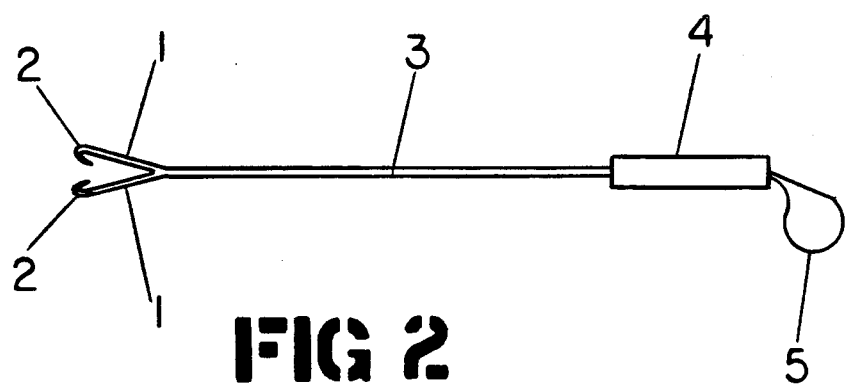
FIG. 2 is a top plan view of the structure shown in FIG. 1.
Figure 3:
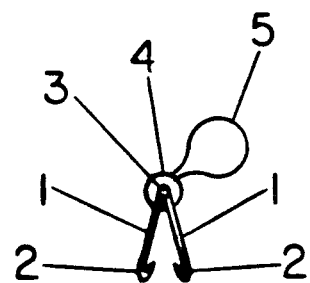
FIG. 3 is an end view of the gaff.

Referring to the drawings, and more particularly to FIGS. 1 and 2 it may be seen that the improvement of the present device over existing gaff hooks resides in the dual hook assembly 1 and 2 and its orientation with respect to the elongate shaft 3. The hook assembly comprises two secondary shaft members 1 rigidly secured to elongate shaft 3 and angled therefrom. Hook portions 2 are formed integrally at the ends of the respective secondary shaft members 1. It has been found that providing a hook portion angled and offset from the longitudinal axis of the elongate shaft of a gaffing device greatly increases the effectiveness of the gaff in securely snagging fish. More specifically it has been found most advantageous to angle the secondary shaft members 1 so as to extend away from the handle portion 4 and to lie in a common plane with respect to each other angled from the longitudinal axis of elongate shaft 3 from 25°–35°. As can be seen in FIG. 1, it is also advantages to form the hook portions 2 by bending the ends of the secondary shaft members 2 through an arc of 180° so as to be directed back towards the elongate shaft 3 parallel to, and spaced from the plane containing the secondary shaft members 1. As seen in FIGS. 2 and 3, it is also advantageous to angle the secondary shaft members 2 away from each other symmetrically about the longitudinal axis of the elongate shaft 3. The angle of each member 2 with respect to the axis of symmetry is most advantageously between 12° and 16°. The hook assembly 1, 2 is desirably formed of steel with barbs secured fixedly to the end of the shaft 3 by any known and convenient manner. Shaft 3 may be rod formed of plastic, wood, or metal. Shaft 3 at the opposite end of the gaff hooks comprises a handle 4 which is desirably formed of wood, plastic, cork, or metal, and attached in any convenient manner to shaft 3. Also advantageous is a circular strap 5 attached to the end of the handle by any known and convenient manner.

What I claim is:

1. An improved fish gaffing device comprising an elongate shaft with a handle at one end and a hook assembly at the shaft's opposite end, wherein the improvement comprises: said hook assembly including two shaft members rigidly secured to said elongate shaft, said two shaft members angled from said elongate shaft so as to lie in a single plane angled between 25°–35° from the longitudinal axis of said elongate shaft and extending away from the handle end of the elongate shaft, said two shaft members further extending in a direction angled away from each other symmetrically about the longitudinal axis of said elongate shaft an an angle of 12°–16° from said longitudinal axis, said two shaft members each having formed integrally at their ends, single hook portions curved through an arc of 180° with pointed end portions lying in a plane parallel to but spaced from said single plane.

* * * * *